US012750678B2

(12) United States Patent
Sharaga et al.

(10) Patent No.: US 12,750,678 B2
(45) Date of Patent: Sep. 29, 2026

(54) DIGITAL PRODUCTION OF SUBSCRIBER IDENTITY MODULES

(71) Applicant: ALTAIR SEMICONDUCTOR LTD, Hod Hasharon (JP)

(72) Inventors: Avishay Sharaga, Beit Nehemya (IL); Lavi Semel, Tel Aviv (IL); Yehuda Ben-Simon, Ramat Hasharon (IL); Oleg Marinchenco, Modi'in-Maccabim-Reut (IL); Carmit Tamir, Tel Aviv (IL); Omer Botvin, Herzliya (IL)

(73) Assignee: ALTAIR SEMICONDUCTOR LTD, Hod Hasharon (IL)

( * ) Notice: Subject to any disclaimer, the term of this patent is extended or adjusted under 35 U.S.C. 154(b) by 28 days.

(21) Appl. No.: 18/715,757

(22) PCT Filed: Dec. 11, 2022

(86) PCT No.: PCT/IB2022/062030
§ 371 (c)(1),
(2) Date: Jun. 3, 2024

(87) PCT Pub. No.: WO2023/105496
PCT Pub. Date: Jun. 15, 2023

(65) Prior Publication Data

US 2025/0039675 A1 Jan. 30, 2025

Related U.S. Application Data

(60) Provisional application No. 63/288,611, filed on Dec. 12, 2021.

(51) Int. Cl.
*H04W 12/72* (2021.01)
*H04L 67/30* (2022.01)
(Continued)

(52) U.S. Cl.
CPC ............ *H04W 12/72* (2021.01); *H04L 67/30* (2013.01); *H04W 4/60* (2018.02); *H04W 8/245* (2013.01); *H04W 12/069* (2021.01)

(58) Field of Classification Search
None
See application file for complete search history.

(56) References Cited

U.S. PATENT DOCUMENTS

2010/0311402 A1* 12/2010 Srinivasan ............ H04W 8/183 455/418
2016/0337780 A1 11/2016 Li et al.
(Continued)

FOREIGN PATENT DOCUMENTS

EP 3648493 A1 5/2020
EP 3742770 A1 11/2020
WO 2021/239272 A1 12/2021

OTHER PUBLICATIONS

International Search Report and Written Opinion mailed on Mar. 9, 2023, received for PCT Application No. PCT/IB2022/062030, filed on Dec. 11, 2022, 14 pages.

*Primary Examiner* — Scott B Christensen
(74) *Attorney, Agent, or Firm* — Meitar Patents Ltd.; Daniel Kligler

(57) ABSTRACT

An edge device includes a memory and circuitry. The circuitry is configured to communicate over a communication network, including serving as a Subscriber Identity Module (SIM) of the edge device, to be pre-configured with security credentials assigned to the SIM, to receive, over the communication network or over an alternative communication channel, at least a portion of a SIM-blob, the portion including at least part of a SIM Operating System (SIM-OS) for operating the SIM, to store the SIM-blob in the memory,
(Continued)

to provision the SIM-OS using the security credentials, and to carry out SIM tasks for the edge device using the SIM-OS.

20 Claims, 3 Drawing Sheets

(51) Int. Cl.
*H04W 4/60* (2018.01)
*H04W 8/24* (2009.01)
*H04W 12/069* (2021.01)

(56) References Cited

U.S. PATENT DOCUMENTS

2023/0073252 A1* 3/2023 Chaugule .............. H04W 60/04
2023/0081421 A1* 3/2023 Jin ........................ H04W 60/04
455/418

* cited by examiner

DIGITAL PRODUCTION OF SUBSCRIBER IDENTITY MODULES

CROSS-REFERENCE TO RELATED APPLICATIONS

This application is based on PCT filing PCT/IB2022/062030, filed Dec. 11, 2022, which claims the benefit of U.S. Provisional Patent Application 63/288,611, filed Dec. 12, 2021, the entire contents of each are incorporated herein by reference.

FIELD OF THE INVENTION

The present invention relates generally to Subscriber Identity Modules (SIMs) of edge devices, and particularly to methods and systems for remote production and provisioning of SIMs.

BACKGROUND OF THE INVENTION

Edge devices in cellular networks, such as cellular phones and Internet-of-Things (IoT) devices, typically identify to the connectivity provider network using Subscriber Identity Modules (SIMs). A SIM typically stores information such as the device owner's International Mobile Subscriber Identity (IMSI), an authentication key and other security credentials, and other information relating to the user and to the Mobile Network Operator (MNO).

The SIM form factor has evolved over time, starting with user-replaceable SIM cards, to an embedded SIM (eSIM) implemented as a standalone integrated circuit in the device, to an integrated SIM (iSIM) integrated into the chipset of the device.

Since eSIMs and iSIMs are not user-replaceable, adoption of these form factors requires a mechanism and infrastructure for changing the MNO in an edge device that is already deployed in the field. The GSM Association (GSMA) specified a framework for such Remote SIM Provisioning (RSP) in GSMA Official Document SGP.21 entitled "RSP Architecture," version 3.0, Mar. 28, 2022; in GSMA Official Document SGP.22 entitled "RSP Technical Specification," version 3.0, Oct. 19, 2022; and in GSMA Official Document SGP.31 entitled "eSIM IoT Architecture and Requirements," version 1.0, Apr. 19, 2022, which are incorporated herein by reference.

SUMMARY OF THE INVENTION

An embodiment of the present invention that is described herein provides an edge device including a memory and circuitry. The circuitry is configured to communicate over a communication network, including serving as a Subscriber Identity Module (SIM) of the edge device, to be pre-configured with security credentials assigned to the SIM, to receive, over the communication network or over an alternative communication channel, at least a portion of a SIM-blob, the portion including at least part of a SIM Operating System (SIM-OS) for operating the SIM, to store the SIM-blob in the memory, to provision the SIM-OS using the security credentials, and to carry out SIM tasks for the edge device using the SIM-OS.

In an embodiment, the portion of the SIM-blob, received over the communication network or over the alternative channel, further includes a profile of a network operator associated with the SIM. In an example embodiment, the portion of the SIM-blob, received over the communication network or over the alternative channel, further includes a certificate for subsequent changing of the profile.

In a disclosed embodiment, the circuitry is configured to obtain at least the portion of the SIM-blob by: establishing a connection with the communication network using a dedicated SIM that is designated for SIM-blob provisioning and is running in a non-secure software environment; and requesting and receiving at least the portion of the SIM-blob over the established connection. In some embodiments, the circuitry is configured to receive at least the portion of the SIM-blob by communicating over a non-cellular wireless network.

In a disclosed embodiment, the SIM-blob is pre-stored in the memory in encrypted form using a unique key, the portion of the SIM-blob, received over the communication network or over the alternative channel, includes the unique key, and the circuitry is configured to provision the SIM-OS by decrypting the pre-stored SIM-blob using the received unique key.

In an embodiment, the SIM-blob includes a generic portion and a device-specific portion, the generic portion of the SIM-blob is pre-stored in the memory, the portion of the SIM-blob, received over the communication network or over the alternative channel, includes the device-specific portion of the SIM-blob, and the circuitry is configured to provision the SIM-OS by combining the generic portion and the device-specific portion.

There is additionally provided, in accordance with an embodiment of the present invention, a network device including a network interface and one or more processors. The network interface is configured for communicating with a network. The one or more processors are configured to receive over the network a message from an edge device, the message requesting provisioning of a Subscriber Identity Module (SIM) of the edge device, to identify, based on the request, a server assigned to provision the SIM, and to establish a communication connection between the edge device and the identified server, for provisioning the SIM.

In some embodiments, the one or more processors are configured as an isolated network enclave dedicated only for provisioning of SIMs. In an embodiment, the one or more processors are configured to identify the server from among multiple servers of multiple SIM vendors. In a disclosed embodiment, the one or more processors are configured to verify an authenticity of the request before establishing the communication connection between the edge device and the server.

There is also provided, in accordance with an embodiment of the present invention, a server including a network interface and one or more processors. The network interface is configured for communicating with a network. The one or more processors are configured to receive over the network a message from an edge device, the message requesting provisioning of a Subscriber Identity Module (SIM) of the edge device, and, in response to the request, to send to the edge device at least a portion of a SIM-blob, the portion including at least part of a SIM Operating System (SIM-OS) for operating the SIM.

In some embodiments, the one or more processors are configured to further include, in the SIM-blob sent to the edge device, a profile of a network operator associated with the SIM. In some embodiments, the one or more processors are configured to further include, in the SIM-blob sent to the edge device, a certificate for subsequent changing of the profile.

There is further provided, in accordance with an embodiment of the present invention, a method in an edge device.

The method includes, in an edge device that communicates over a communication network and is pre-configured with security credentials assigned to a Subscriber Identity Module (SIM) of the edge device, receiving, over the communication network or over an alternative communication channel, at least a portion of a SIM-blob, the portion including at least part of a SIM Operating System (SIM-OS) for operating the SIM. The SIM-blob is stored in a memory. The SIM-OS is provisioned using the security credentials. SIM tasks for the edge device are carried out using the SIM-OS.

There is also provided, in accordance with an embodiment of the present invention, a method in a network device. The method includes receiving over a network a message from an edge device, the message requesting provisioning of a Subscriber Identity Module (SIM) of the edge device. A server assigned to provision the SIM is identified based on the request. A communication connection is established between the edge device and the identified server, for provisioning the SIM.

There is additionally provided, in accordance with an embodiment of the present invention, a method in a server. The method includes receiving over a network a message from an edge device, the message requesting provisioning of a Subscriber Identity Module (SIM) of the edge device. In response to the request, at least a portion of a SIM-blob is sent to the edge device. The portion includes at least part of a SIM Operating System (SIM-OS) for operating the SIM.

The present invention will be more fully understood from the following detailed description of the embodiments thereof, taken together with the drawings in which:

DETAILED DESCRIPTION OF EMBODIMENTS

Overview

Figure 1:
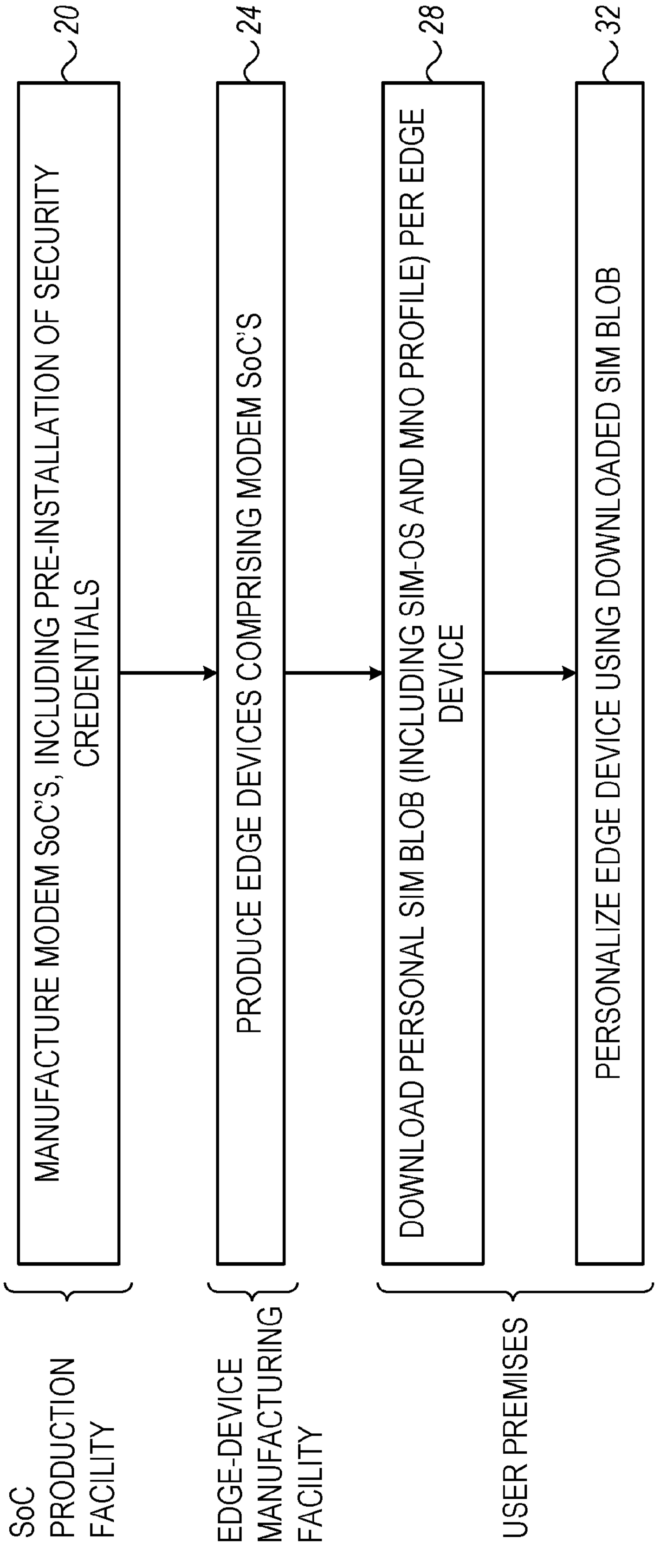
FIG. 1 is a flow chart that schematically illustrates a process of iSIM production and provisioning, in accordance with an embodiment of the present invention.

A fully operational SIM, regardless of form factor, typically comprises (i) security credentials associated with the SIM (ii) a software stack referred to as a "SIM Operating-System" (SIM-OS), and (iii) an "MNO profile" specifying network-operator related information. The SIM-OS and the MNO profile are referred to herein jointly as a "SIM-blob". In some embodiments, e.g., in eSIMs and iSIMs, the SIM-blob may also comprise a "GSMA certificate" used for remote changing of MNO.

When producing and provisioning SIM-blobs, it is critical that the SIM production and provisioning process fits well into the overall supply chain of the edge device and its components.

Consider, for example, a typical supply chain of a discrete eSIM. eSIMs are typically produced and provisioned in highly-secure facilities. Within the secure facility, eSIMs are manufactured and tested, and each eSIM is individually personalized with at least a GSMA certificate and a SIM-OS (and optionally with an MNO profile). The eSIMs are then supplied to a module vendor or OEM for installation of a circuit board that is then assembled as part of an edge device. The module vendors or OEMs typically order fixed-size batches of pre-provisioned eSIMs from SIM vendors. The MNO profile, if not pre-installed on the eSIM, is later downloaded remotely to each eSIM, e.g., by the MNO or the user, using the GSMA RSP infrastructure.

The supply chain of an iSIM, in contrast, typically begins with manufacturing of modem chipsets, e.g., in the form of a System-on-Chip (SoC). The iSIM hardware is an integral part of the modem chipset. The modem chipsets are then supplied to module vendors or edge-device vendors. In the iSIM supply chain, the modem chipsets, including the iSIM hardware, are manufactured in an IC production facility. Modem chipsets are typically manufactured in large batches that are not pre-assigned to a specific customer, device manufacturer or MNO.

The differences between the eSIM and iSIM supply chains have a critical impact on the provisioning process. Trying to impose the eSIM provisioning process on the iSIM supply chain would mean, for example, forcing a non-secure production facility to produce modem chipsets that are individually personalized securely with GSMA certificates and SIM-OSs. Such modem chipsets would typically have to be produced in small, project-specific batches.

Moreover, IC and edge-device production facilities are accustomed to produce batches having a high but less-than-perfect yield, meaning a batch size that is not necessarily exact and may include some margin. Personalizing iSIMs as part of the edge-device manufacturing supply chain, however, would require the production facility to deliver exact-size batches including accounting/compensating for imperfect yield, per a specific MNO order. Subscription activation time is also an open issue in this process. As can be appreciated from the above, forcing the eSIM provisioning process on the iSIM supply chain is all but infeasible, and could severely impact the scale, cost, and complexity of adoption of the iSIM form factor.

Embodiments of the present invention that are described herein provide improved methods and systems for producing and provisioning of SIMs. The embodiments described herein refer mainly to iSIMs, by way of example. The disclosed techniques, however, are also applicable to eSIMs, as well as to any other suitable SIM form factor, including future form factors that are not currently defined.

In some disclosed embodiments, modem chipsets are pre-configured with security credentials. The security credentials are typically stored in secure hardware integrated in the SoC, e.g., a Tamper-Resistant Element (TRE). In the present context, the security credentials are referred to as a chip Root-of-Trust (ROT) installed in the modem chipset. The SIM-blobs, however, are not installed (at least not in full) at the chipset manufacturing stage, but rather downloaded at a later stage to fully-assembled and operational edge devices. Downloading of the SIM-blob can be performed together with downloading of the MNO profile, using a disclosed extension of the GSMA RSP infrastructure.

Downloading of the SIM-OS may be performed Over-The-Air (OTA), i.e., over a cellular network. A technique of this sort, which uses a software-implemented SIM that is dedicated for provisioning, is described in detail herein. This software-implemented SIM functionality is not required to be secure and may run on any component of the chipset, not necessarily on secure hardware.

In alternative embodiments, the SIM-OS may be downloaded to a device over a Wi-Fi link, i.e., over a Wireless Local-Area Network (WLAN), or over any other suitable wireless or wired channel.

The disclosed techniques fit well into the supply chain of iSIM-based edge devices because they do not require pre-binding of any SIM-blob to an individual modem chipset. The binding is performed later, in a fully assembled, operational edge device.

In some embodiments, in addition to eliminating pre-binding of SIM-blobs to chipsets, the disclosed techniques also aim to reduce the communication overhead incurred by downloading the SIM-blobs over the network. These solutions are particularly useful in low-throughput, battery-powered IoT devices.

For example, in some embodiments the SIM-blobs are stored in the modem chipsets at the chipset manufacturing stage, not downloaded OTA. Each SIM-blob is encrypted with a unique key, but is not bound a-priori to any individual chipset. To provision an edge device, the unique key for the pre-installed SIM-blob is downloaded to the device instead of the actual SIM-blob. In this manner, binding of the SIM-blob is performed only in the full operational device, not at any step of the chipset manufacturing stage. The operational challenges stemming from pre-binding are therefore eliminated. In the present context, downloading a key that enables decryption of a SIM-blob is also regarded as downloading a portion of the SIM-blob.

In other embodiments, the SIM-OS is split into a generic portion (also referred to as a static portion) and a device-specific portion. The generic portion is installed at the chipset manufacturing stage, and only the device-specific portion is downloaded to the operational device.

In summary, in some embodiments the disclosed techniques use an extension of the GSMA RSP infrastructure for complete remote production and provisioning of iSIMs. The disclosed techniques enable iSIMs to be produced and provisioned as part of the edge-device supply chain without adding any operational or logistic complications.

Process Description

FIG. 1 is a flow chart that schematically illustrates a process of iSIM production and provisioning, in accordance with an embodiment of the present invention. The method begins with manufacturing of modem chipsets, in the present example SoCs, at a chipset manufacturing stage 20. This stage may be performed, for example, in an IC production facility. As part of the SoC manufacturing stage, each SoC is pre-installed with security credentials (also referred to as a chip RoT) that typically comprise a private-public key pair and additional credentials.

Subsequently, at a device manufacturing stage 24, edge devices are produced in an edge-device manufacturing facility. Each edge device comprises one of the chipsets manufactured at stage 20 above.

Further along the supply chain, a respective SIM-blob (or at least a portion thereof) is downloaded to each edge device, at a blob downloading stage 28. The downloaded blob, or portion of a blob, comprises (i) at least part of the SIM-OS and/or (ii) an MNO profile. The SIM-blob may also comprise additional components, such as GSMA RSP framework (e.g., a GSMA certificate) to enable device 44 to support RSP after installation.

At a personalization stage 32, each edge device is personalized individually using the downloaded SIM-blob. Stages 28 and 32 may be carried out by the edge-device vendor (e.g., before delivering a new edge device to an MNO or to a user) or by the user (e.g., upon connecting to a network—cellular or other).

The flow of FIG. 1 is a highly simplified flow meant to demonstrate the general principles of the disclosed techniques. The various stages of the process are described in detail, with various variations and implementation options, further below.

Example System Configuration

Figure 2:
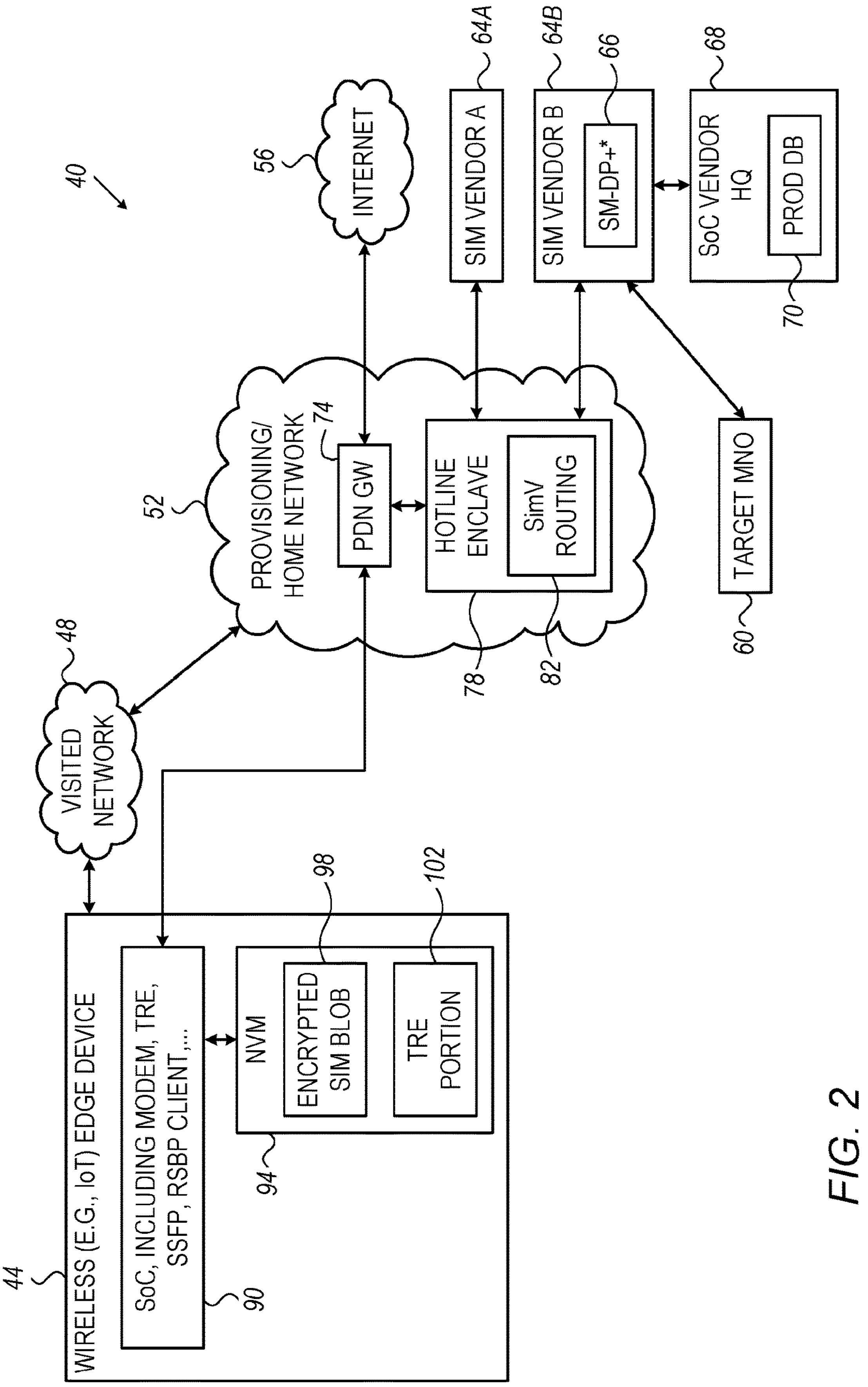
FIG. 2 is a block diagram that schematically illustrates a cellular-network based communication system that supports remote production and provisioning of iSIMs, in accordance with an embodiment of the present invention.

FIG. 2 is a block diagram that schematically illustrates a cellular-network based communication system 40 that supports remote production and provisioning of iSIMs, in accordance with an embodiment of the present invention. The various components of system 40 are introduced briefly in this section, and their roles in carrying out the disclosed techniques are explained further below.

System 40 comprises one or more edge devices 44, typically a large number of edge devices of various kinds. An edge device 44 may comprise, for example, a cellular phone, an IoT device, or any other suitable device capable of communicating over a network. FIG. 2 shows a single edge device 44 for the sake of clarity. Edge devices 44 are also referred to herein as simply "devices", for brevity.

In the present example, device 44 is currently connected to a cellular network, referred to as a visited network 48. In other words, device 44 is roaming. In alternative embodiments or scenarios, device 44 may be connected directly to its home network. In addition, system 40 comprises a "provisioning/home network" (also referred to as a "home network for provisioning", or simply "provisioning network" for brevity) that is responsible for iSIM provisioning. In some embodiments, network 52 is a full-fledged network that provides various services to edge devices, including the disclosed provisioning service. Networks 48 and 52, and device 44, may operate in accordance with any suitable cellular standard or protocol, e.g., fourth-generation long-term evolution (LTE) or fifth-generation cellular (5G).

System 40 further comprises computing systems 64 of one or more iSIM-vendors 64, in the present configuration two systems denoted "SIM vendor A" 64A and "SIM vendor B" 64B. The terms "vendor" and "vendor system" are sometimes used interchangeably herein. In the example of FIG. 2, the iSIM of device 44 is provided by SIM vendor B (system 64B). System 64B is thus connected to an MNO-system 60 of the MNO used for provisioning. System 64B comprises, among other elements, a Subscription Manager Data Preparation server (SM-DP+*) 66, whose role is explained further below. System 64B may be connected to a system 68 belonging to the vendor of the edge-device's SoC. System 68 comprises, among other elements, a production database 70 of the iSIMs and/or Tamper-Resistant Elements (TREs) of SoCs produced by that vendor.

Network 52 comprises a Packet Data Network Gateway (PDN GW) 74 that routes traffic between devices 44 and the various networks of system 40, including Internet 56, as appropriate. Network 52 further comprises a "hotline enclave" 78-A separate service enclave that is dedicated to traffic relating to iSIM provisioning. Enclave 78 comprises a SIM vendor (SimV) routing module 82, which routes traffic between each edge devices 44 and the relevant SIM vendor system.

In a typical configuration, PDN GW 74 is configured to identify traffic relating to iSIM provisioning and to forward such traffic to enclave 78. PDN GW 74 may be a conventional, off-the-shelf produce (implemented in hardware or in software) that is configured in the above-described manner. Enclave 78 may also be implemented in hardware and/or in software, e.g., as a standalone network device, as cloud-resident software, or shared on the same platform with other elements, such as with PDN GW 74. In any configuration, enclave 78 can be regarded as a (software- and/or hardware-implemented) network device comprising (i) a network interface for communicating with the core network of home network 52, and (ii) one or more processors that carry out the disclosed techniques.

In the embodiment of FIG. 2, edge device 44 comprises a SoC 90. SoC 90 comprises one or more Integrated Circuit (IC) dies that implement, for example, a cellular modem chipset for communicating with network 48, a Software SIM For Provisioning (SSFP—a software-implemented SIM dedicated for iSIM provisioning), and a Remote Sim Blob Provisioning (RSBP) client that orchestrates the download and installation of the SIM-blob. SoC 90 further comprises a Tamper-Resistant Element (TRE)—A secure part of the SoC on which the iSIM is implemented.

Device 44 further comprises a Non-Volatile Memory (NVM) 94, e.g., a Flash memory device. NVM 94 may be internal or external to SoC 90. NVM 94 may be used for storing any relevant software and/or data for device 44. In the present example NVM 94 comprises a secure partition referred to as a TRE portion 102. TRE portion 102 is used, among other uses, for securely storing the installed iSIM (including the SIM-OS, certificate, credentials, and MNO profile).

The configurations of system 40 and edge device 44 as illustrated in FIG. 2 are example configurations, which are chosen purely for the sake of conceptual clarity. Any other suitable configurations can be used in alternative embodiments. For example, the internal partitioning of edge device 44 and "division of labor" among the elements of device 44 may differ from the example implementation shown in FIG. 2. Generally, the elements of device 44 other than NVM 94 are referred to jointly as circuitry that carries out the disclosed techniques.

The different elements of system 40 and edge device 44 may be implemented using suitable hardware, such as in one or more Application-Specific Integrated Circuits (ASICs) or Field-Programmable Gate Arrays (FPGAs), using software, using hardware, or using a combination of hardware and software elements.

Various elements of system 40 and edge device 44, 66, such as, for example, enclave 78, SimV routing module 82, SM-DP+* 66, as well as certain parts of SoC 90, may be implemented using one or more general-purpose processors, which are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory.

Remote ISIM Production and Provisioning

As explained above, a fully functional iSIM on an edge device 44 should comprise (i) security credentials (chip RoT) and (ii) a SIM-blob comprising a SIM-OS and an MNO profile. To be operational, the SIM-blob has to be installed on the edge-device TRE, and activated in the MNO system. The security credentials are pre-installed in SoC 90 (see stage 20 of FIG. 1). The SIM-blob, or at least a portion thereof, is downloaded to and installed on the fully-manufactured edge device 44.

Typically, the SIM-blob is downloaded to device 44 from SM-DP+* 66 of the appropriate SIM vendor. The notation "SM-DP+*" denotes a SIM-vendor server that is configured to support remote download of SIM-blobs in accordance with the disclosed techniques (as opposed to "SM-DP+" used in GSMA terminology). SM-DP+* typically comprises (i) a network interface for communicating with the core network of home network 52, and (ii) one or more processors that carry out the disclosed techniques. The SIM-blob is typically downloaded in encrypted form and stored in NVM 94 of device 44 (see "encrypted SIM-blob" 98 in FIG. 2).

In some embodiments, the SIM-blob is downloaded to device 44 over a cellular connection. In the embodiment of FIG. 2 the SIM-blob is downloaded via visited network 48. In alternative embodiments, the SIM-blob may be downloaded via any other suitable communication channel. Example non-cellular channels may comprise a WLAN ("Wi-Fi"), a Personal-Area Network (PAN), or a wired connection. The description that follows focuses mainly on downloading over the cellular network (also referred to as Over-The-Air (OTA) downloading) by way of example.

When downloading SIM-blob 98 over cellular networks 48 and 52, the communication between device 44 and networks 48 and 52 should be carried out using some alternative or temporary SIM, since the final intended iSIM of the device is not provisioned yet. In some embodiments device 44 comprises an alternative physical SIM (e.g., eSIM) that is used for this purpose. In other embodiments, device 44 runs a "soft-SIM", i.e., a software component that acts as a SIM from the network perspective and is configured to connect to a cellular network).

In an example embodiment, SoC 90 of device 44 runs a soft-SIM referred to as "Soft SIM For Provisioning" (SSFP). The SSFP is dedicated for provisioning the final iSIM of the device. The provisioning process using SSFP assumes that the SSFP is not secure (not trustworthy). The process limits the SSFP-based connection to a dedicated network partition (enclave 78 of FIG. 2) in a manner that is fully compliant with the functionality and interoperability defined by the cellular industry (e.g., 3GPP and GSMA). In an embodiment, connecting to the cellular network using the SSFP is performed as follows:

- The SSFP comprises one or more network credentials (e.g., one or more IMSI values and one or more cryptographic keys (Ki)) of an MxNO (MNO or Mobile Virtual Network Operator—MVNO) that deploys the cellular-based communication channel for provisioning. These security credentials are not required or assumed to be confidential, and may be publicly known.
- Using these IMSI(s) and Ki(s), device 44 can connect to any cellular network having a roaming agreement with this MxNO.
- The communication with the MxNO is configured to always be routed to the MxNO's home core network.
- PDN GW 74 in home network 52 (the home network for provisioning) identifies device 44 (or the communication traffic of device 44) as belonging to the provisioning process, and routes the traffic to hotline enclave 78. Enclave 78 allows only SIM-blob provisioning and no other functionality.
- Since the network credentials (IMSI/Ki) are assumed to be publicly known, enclave 78 should verify that the traffic indeed originates from a legitimate and authorized edge device that requests a SIM-blob. This verification can be performed, for example, by using secret credentials of the TRE of device 44 for authentication.
- Only after verifying the authenticity of the requesting device 44, enclave 78 establishes a data channel for downloading the SIM-blob from SM-DP+* 66.

In some embodiments, a complete end-to-end iSIM provisioning process using the SSFP comprises the following stages:

- Edge device 44 powers up and connects to cellular network 48 using the SSFP.
- Connectivity-layer authentication of device 44 with home network 52 is completed, and an IP connection is established between the device and the home network.
- Device 44, being aware that it can only communicate with the provisioning function, sends a message (e.g., by the RSBP client) requesting iSIM provisioning.
- The home network forwards the device communication to enclave 78, which is responsible for iSIM provisioning. Within enclave 78, SimV routing module 82 identifies the device and, based on the identification, finds which SIM vendor is assigned to provision this device with a SIM-blob or at least a device-specific portion of the SIM-blob (possibly including GSMA framework and GSMA certificate). Having selected the appropriate SIM vendor, Sim V routing module 82 identifies a network address (e.g., IP address) of the SM-DP+* 66 of the selected SIM-vendor.
- SimV routing module 82 forwards the request to the SM-DP+* 66 of the relevant SIM-vendor. Generally, the SM-DP+* may reside in the MNO provisioning network or on the SIM vendor premises.
- The SM-DP+* uses the unique credentials, which match the identity of device 44, to prepare a personal SIM-blob for this specific device. The SM-DP+* secures the SIM-blob (for example using information received from SoC vendor production database 70).
- SM-DP+* 66 sends the encrypted SIM-blob 98 to device 44 over networks 52 and 48.
- Device 44 installs SIM-blob 98 on the TRE and sends an acknowledgement to SM-DP+* 66.
- SM-DP+* 66 activates the MNO profile with the MNO network and sends device 44 a command to switch to the newly installed iSIM.
- Device 44 disconnects from the network, switches from using SSFP to using the iSIM, and re-connects to the network using its commercial connectivity provisioned on the iSIM.

Figure 3:
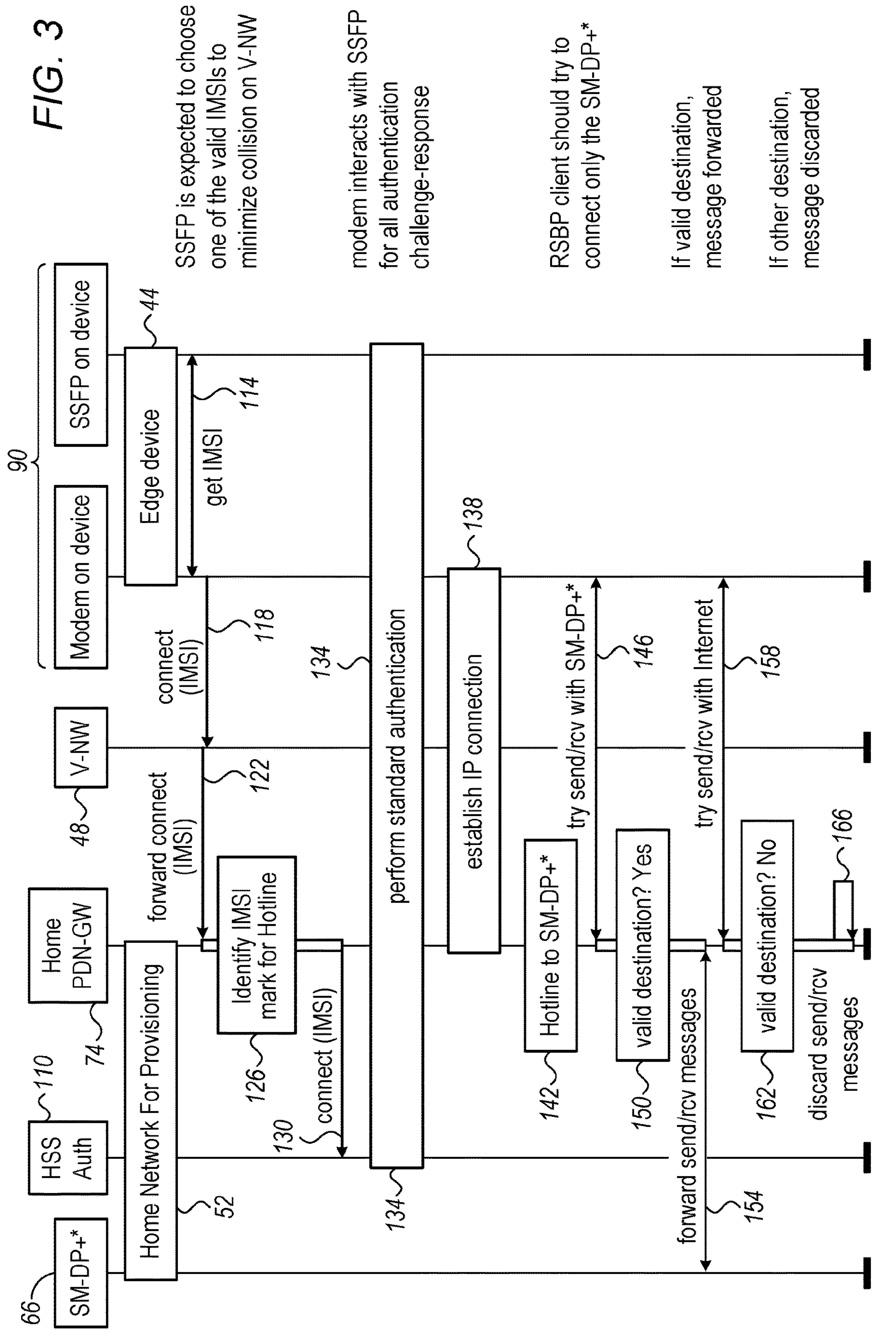
FIG. 3 is a message-flow diagram that schematically illustrates a method for remote production and provisioning of an iSIM, in accordance with an embodiment of the present invention.

FIG. 3 is a message-flow diagram that schematically illustrates remote production and provisioning of an iSIM using a SSFP, in accordance with an embodiment of the present invention. The system components participating in the process are (i) SM-DP+* 66 (the SIM vendor's server), (ii) an authentication server 110 (referred to as Home Subscriber Server-HSS) in home network 52, (iii) PDN GW 74 in home network 52, (iv) visited network (V-NW) 48, and (v) the modem and SSFP in SoC 90 of edge device 44.

The process begins with the edge-device modem obtaining an IMSI from the SSFP, for use in communication traffic relating to the iSIM provisioning, at an IMSI retrieval stage 114. The SSFP typically chooses one of the IMSIs that are pre-assigned for the provisioning process, and provides this IMSI to the modem.

At a V-NW connection requesting stage 118, the edge-device modem sends a connection request to visited network 48. At a request forwarding stage 122, visited network 48 forwards the connection request to home network 52 (in the present example to PDN GW 74). Network 52 authenticates device 44 based on the IMSI and corresponding Ki, and allows V-NW to accept the device.

At a provisioning identification stage 126, PDN GW 74 detects, based on the IMSI in the connection request (or additional parameters such as APN), that the request relates to the iSIM provisioning process. At an authentication stage 130, PDN GW 74 verifies the authenticity of the IMSI by communicating with HSS 110. HSS 110, in turn, performs a conventional authentication process 134.

Assuming the authentication process is successful, PDN GW 74 establishes an IP connection with the edge-device modem, at a connection setup stage 138. At an enclave forwarding stage 142, SimV routing module 82 in hotline enclave 78 selects the SIM vendor with which the iSIM provisioning process should be performed.

At a SM-DP+* communication stage 146, the RSBP client in the edge-device modem attempts communicating with SM-DP+* 66 of the selected SIM vendor. At a validity check stage 150, PDN GW 74 verifies that the destination IP address of the RSBP client's message is associated with the provisioning system, e.g., with enclave 78.

If the destination address is valid, PDN GW 74 forwards the provisioning traffic between the edge-device modem and SM-DP+* 66, at a provisioning communication stage 154. At this stage, the edge-device modem downloads SIM-blob 98 from SM-DP+* 66, and stores the downloaded SIM-blob in NVM 94.

An Internet communication stage 158 illustrates a possible illegitimate attempt ("misbehavior") of the RSBP client in the edge-device to communicate over the Internet (and not with enclave 78). If, at an invalid destination detection stage 162, PDN GW 74 finds that the destination IP address of the RSBP client's message is invalid (i.e., does not belong to enclave 78 or to the destination SM-DP+*), the PDN GW discards the messages from the edge-device modem, at a discarding stage 166.

Bandwidth- and Energy-Efficient Downloading of SIM-Blobs

In many practical scenarios it is highly desirable to minimize the amount of energy and bandwidth needed for downloading SIM-blob 98 to edge device 44. The size of a complete SIM-blob, including a SIM-OS, an MNO profile and additional GSMA RSP framework, may reach several hundred Kilobytes. Downloading a blob of this size over the air may be challenging or even prohibitive in some scenarios, for example when edge-device 44 is a battery-operated, low-speed IoT device.

In some embodiments, system 40 employs measures that reduce the size of the SIM-blob (or portion thereof) that is downloaded over the air to device 44. At the same time, these measures do not require pre-binding of the SIM-blob to a specific edge device at the time of chipset production.

Example 1—Post-Binding of SIM-Blob

In an example embodiment, the SIM-blob is protected with a unique symmetric key that is securely generated by the SIM-blob creator (typically the SIM vendor). The SIM vendor holds a database of SIM-Blob IDs and the corresponding unique keys. The physical production facility of edge devices 44 is provided with SIM-blobs for the number of edge devices 44 to be produced.

During production of edge devices 44, a different SIM-blob is stored on NVM 94 of each device 44. Since the SIM-blob is encrypted with a key that is unknown to the device manufacturer or to the device, the device cannot decrypt or use the SIM-blob. A given SIM-blob can be post-bound to a single device 44 only.

Since the SIM-blobs are not assigned to specific SoCs 90 or modem chipsets, logistical issues such as pre-identifying chips, yield issues and others, are avoided. The exact number of SIM-blobs can be stored on the same exact number of functional devices 44 that were intended to be produced. A faulty device 44 does not waste a SIM-blob, since the SIM-blob can be transferred from the faulty device to another, functional device 44.

In this embodiment, the communication process with the SM-DP+* remains unchanged. The OTA iSIM production and provisioning process is changed to the following, for a given edge device 44:

The SIM vendor is provided with an identifier (ID) of the individual SIM-blob that is stored on NVM 94 of edge device 44, and with an ID of the individual SoC.

The SIM vendor checks in his database that this SIM-blob has not already been assigned to another SoC. Assuming the SIM-blob has not been assigned yet, the SIM vendor sends the unique key of the SIM-blob to edge device 44. In sending the unique key, the SIM vendor typically protects the unique key using the same scheme it would have protected the full SIM-blob (a scheme that can be processed only within the TRE).

In edge device 44, the information received form the SIM vendor is decrypted inside the TRE. The TRE uses the extracted unique key to decrypt and install the SIM-blob that was stored on NVM 94 during physical production.

Upon successful installation, the edge device reports success to the SIM vendor. In response, the SIM vendor records that the SoC and the SIM-blob are bound to one another, and activates (in the target MNO network) the MNO profile on the SIM-blob in the corresponding MNO network (target MNO 60 of FIG. 2).

In an embodiment, if the SIM vendor server detects that the reported SIM-blob ID is already assigned to another SoC (e.g., due to a mistake in physical production that caused the same blob to be stored on more than one device 44), the process falls back to downloading a full SIM-blob over the air to this edge device 44.

Since only the unique key is downloaded over the air, as opposed to the entire SIM-blob, this technique reduces the bandwidth, and therefore the time and energy, needed for the OTA download.

Example 2—Splitting of SIM-Blob

In another embodiment, the information in the SIM-blob is split into two portions: (i) a device-specific portion that must be bound to a specific SoC in order for the device to operate properly, and (ii) a generic portion that can be installed on different SoCs without requiring pre-binding. When splitting the SIM-blob, it is desirable to include as much information as possible in the generic portion, so as to minimize the size of the device-specific portion.

The generic portion of the SIM-blob is pre-stored (and potentially installed) on all SoCs during physical production using a single generic image. The device-specific portion of the SIM-blob is downloaded over the air and is pre-bound to the requesting SoC, using the provisioning process described herein. Since the device-specific portion is considerably smaller than the entire SIM-blob, this technique reduces the bandwidth, and therefore the time and energy, needed for the OTA download. Edge device 44 typically comprises logic for combining the generic and device-specific portions of the SIM-blob in a secure manner.

Additional Embodiments and Variations

Edge-device recovery from iSIM failure. The disclosed configuration provides an alternative means for communicating with device 44 independently of (e.g., in absence of) an iSIM, e.g., using a SSFP. In some embodiments, this alternative communication scheme is used as a fallback for recovering from failure of the iSIM.

SIM-OS updates ("Firmware Over The Air"—FOTA). In some embodiments, the above-noted alternative communication scheme (e.g., SSFP) is used for updating the SIM-OS over the air ("SIM-OS FOTA") in a risk-free manner.

Provisioning and/or modifying functionality of other secure elements in device 44. The above-noted alternative communication scheme (e.g., SSFP) is not limited to SIM provisioning, and can be used for updating, provisioning and/or modifying functionality of any other suitable secure (or non-secure) element in device 44.

Device assistance and monitoring. In case of loss of communication sensed by device 44, with the disclosed configuration the device has a backup channel to report this event. The network can analyze the cause for the loss of communication and provide commands to the device on how to proceed.

Additional services. The disclosed configuration enables the MNO to provide other services over the available "non secure" cellular channel (the channel using the SSFP). The MNO may, for example, add these services to the isolated network (e.g., enclave 78) with some upper layer authentication. For example, the network may comprise an Internet gateway, which is invoked after device 44 is authenticated and provides a payment method (IoT or consumer).

Although the embodiments described herein mainly address SIMs, the methods and systems described herein can also be used in other applications, such as in digital production or provisioning of credit cards.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An edge device, comprising:

a memory; and circuitry, configured to:

communicate over a communication network, including serving as a Subscriber Identity Module (SIM) of the edge device;

be pre-installed, during manufacturing, with security credentials assigned to the SIM;

receive, over the communication network or over an alternative communication channel, at least a portion of a SIM-blob, the portion comprising at least part of a SIM Operating System (SIM-OS) for operating the SIM, and store the SIM-blob in the memory;

provision the SIM-OS using the security credentials that were pre-installed during manufacturing; and carry out SIM tasks for the edge device using the SIM-OS.

2. The edge device according to claim 1, wherein the portion of the SIM-blob, received over the communication network or over the alternative channel, further comprises a profile of a network operator associated with the SIM.

3. The edge device according to claim 2, wherein the portion of the SIM-blob, received over the communication network or over the alternative channel, further comprises a certificate for subsequent changing of the profile.

4. The edge device according to claim 1, wherein to obtain at least the portion of the SIM-blob, the circuitry is configured to:

establish a connection with the communication network using a dedicated SIM that is designated for SIM-blob provisioning and is running in a non-secure software environment; and request and receive at least the portion of the SIM-blob over the established connection.

5. The edge device according to claim 1, wherein the circuitry is configured to receive at least the portion of the SIM-blob by communicating over a non-cellular wireless network.

6. The edge device according to claim 1, wherein the SIM-blob is pre-stored in the memory in encrypted form using a unique key, wherein the portion of the SIM-blob, received over the communication network or over the alternative channel, comprises the unique key, and wherein the circuitry is configured to provision the SIM-OS by decrypting the pre-stored SIM-blob using the received unique key.

7. The edge device according to claim 1, wherein the SIM-blob comprises a generic portion and a device-specific portion, wherein the generic portion of the SIM-blob is pre-stored in the memory, wherein the portion of the SIM-blob, received over the communication network or over the alternative channel, comprises the device-specific portion of the SIM-blob, and wherein the circuitry is configured to provision the SIM-OS by combining the generic portion and the device-specific portion.

8. A network device, comprising:

a network interface, for communicating with a network; and one or more processors, configured to:

receive over the network a message from an edge device, the message requesting provisioning of a Subscriber Identity Module (SIM) implemented in circuitry of the edge device;

identify, based on the request, a server assigned to provision the SIM; and establish a communication connection between the edge device and the identified server, for provisioning the SIM using security credentials that are pre-installed in the circuitry during manufacturing.

9. The network device according to claim 8, wherein the one or more processors are configured as an isolated network enclave dedicated only for provisioning of SIMS.

10. The network device according to claim 8, wherein the one or more processors are configured to identify the server from among multiple servers of multiple SIM vendors.

11. The network device according to claim 8, wherein the one or more processors are configured to verify an authenticity of the request before establishing the communication connection between the edge device and the server.

12. A server, comprising:

a network interface to communicate with a network; and one or more processors, configured to:

receive over the network a message from an edge device, the message requesting provisioning of a Subscriber Identity Module (SIM) implemented in circuitry of the edge device; and in response to the request, send to the edge device at least a portion of a SIM-blob for further provisioning using security credentials that are pre-installed in the circuitry during manufacturing, the portion comprising at least part of a SIM Operating System (SIM-OS) for operating the SIM.

13. The server according to claim 12, wherein the one or more processors are configured to further include, in the SIM-blob sent to the edge device, a profile of a network operator associated with the SIM.

14. The server according to claim 13, wherein the one or more processors are configured to further include, in the SIM-blob sent to the edge device, a certificate for subsequent changing of the profile.

15. A method in an edge device, the method comprising:

in an edge communicates over a device that communication network and comprises circuitry that serves as a Subscriber Identity Module (SIM) of the edge device, receiving, over the communication network or over an alternative communication channel, at least a portion of a SIM-blob, the portion comprising at least part of a SIM Operating System (SIM-OS) for operating the SIM;

storing the SIM-blob in a memory;

provisioning the SIM-OS using security credentials that are pre-installed in the circuitry during manufacturing and assigned to the SIM; and carrying out SIM tasks for the edge device using the SIM-OS.

16. The method according to claim 15, wherein portion of the SIM-blob, received over the communication network or over the alternative channel, further comprises a profile of a network operator associated with the SIM.

17. The method according to claim 16, wherein the portion of the SIM-blob, received over the communication network or over the alternative channel, further comprises a certificate for subsequent changing of the profile.

18. The method according to claim 15, wherein receiving at least the portion of the SIM-blob comprises:

establishing a connection with the communication network using a dedicated SIM that is designated for SIM-blob provisioning and is running in a non-secure software environment; and requesting and receiving at least the portion of the SIM-blob over the established connection.

19. The method according to claim 15, wherein receiving at least the portion of the SIM-blob comprises communicating over a non-cellular wireless network.

20. The method according to claim 15, wherein the SIM-blob is pre-stored in the memory in encrypted form using a unique key, wherein the portion of the SIM-blob, received over the communication network or over the alternative channel, comprises the unique key, and wherein provisioning the SIM-OS comprises decrypting the pre-stored SIM-blob using the received unique key.

* * * * *